United States Patent [19]

Pero

[11] 4,302,183
[45] Nov. 24, 1981

[54] METHOD AND APPARATUS FOR USE WITH PLASTIC LINED PIPE

[75] Inventor: Richard E. Pero, Midland, Mich.

[73] Assignee: The Dow Chemical Company, Midland, Mich.

[21] Appl. No.: 149,404

[22] Filed: May 13, 1980

[51] Int. Cl.³ .............................................. F24J 3/00
[52] U.S. Cl. ................................. 432/225; 432/226; 432/227
[58] Field of Search ................. 432/10, 225, 226, 227

[56] References Cited

U.S. PATENT DOCUMENTS 3,390,442 7/1968 Sosnowski, Jr. et al. ........ 29/157 R
4,014,640 3/1977 Emery et al. ....................... 432/227

Primary Examiner—John J. Camby
Attorney, Agent, or Firm—R. B. Ingraham

[57] ABSTRACT

Two generally concentric cups and discoidal baffle are employed to provide a uniform heating of thermoplastic liner of lined pipe prior to flanging.

5 Claims, 2 Drawing Figures

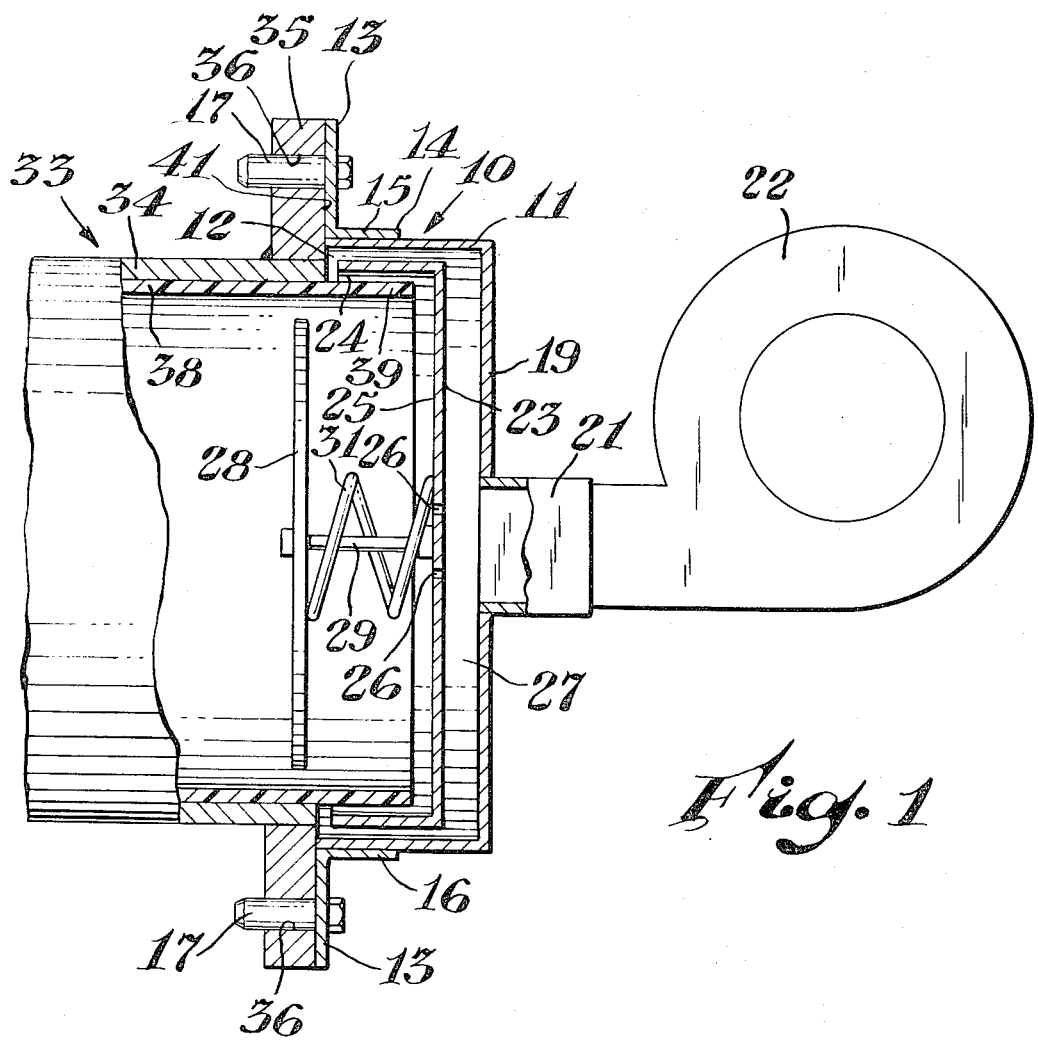
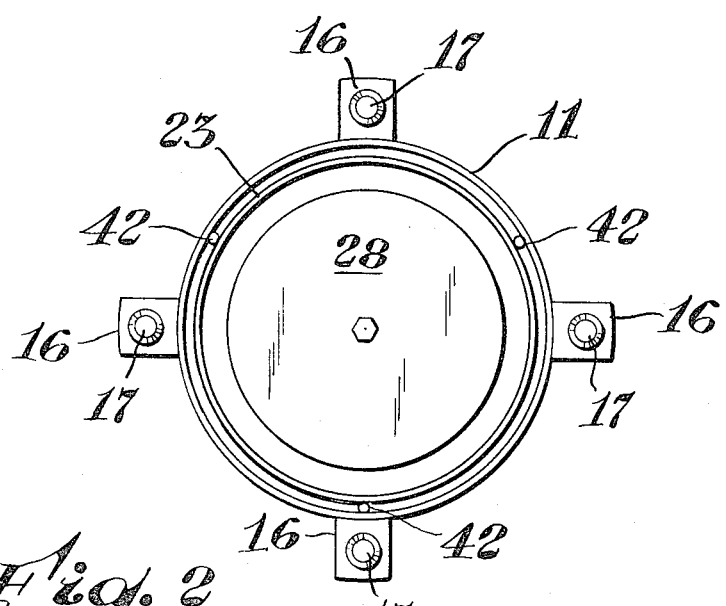

METHOD AND APPARATUS FOR USE WITH PLASTIC LINED PIPE

Pipes or conduits having a thermoplastic lining are widely used for fluid handling of a variety of materials. Such plastic lined pipes have many applications, provide economic and convenient means for the transport of a variety of fluids particularly corrosive liquids and liquids and solvents where minimal metallic contamination can be tolerated. Such plastic lined piping is frequently joined by flanged connections wherein a portion of the metallic outer conduit is removed to provide a projecting plastic liner. A flange is then fitted to the metallic conduit and the projecting portion of the thermoplastic liner is heated and deformed to conform to the adjacent face of the metallic flange. Methods and apparatus for such flanging are well known and are described in the following U.S. Patents, the teachings of which are herewith incorporated by reference thereto: U.S. Pat. Nos. 3,335,484; 3,383,750; 3,390,442; 3,488,491; 3,461,505; 2,823,418; 3,013,310; 3,142,868; 3,341,894; 3,435,109; 3,563,573. Much of the described methods and equipment are more suitable for flanging of liners in a shop or permanent location than for flanging liners in the field with smaller diameter conduits, for example 2 to 3 inch nominal piping diameters. Field flanging of large conduits is done with difficulty primarily because of the lack of convenient portable means for uniformly heating the lining prior to flanging.

It would be desirable if there were available an improved method for the heating of the thermoplastic lined conduit.

It would be desirable if there were available an improved apparatus for the uniform heating of thermoplastic lined conduit liner prior to flanging.

It would be desirable if there were available an improved method and apparatus for the heating of thermoplastic lined conduit liner prior to flanging suitable for use in the field.

These benefits and other advantages in accordance with the present invention are achieved in a method for the heating of a portion of a thermoplastic liner of a thermoplastic lined conduit, the steps of the method comprising providing a stream of heated gas about a projecting end of a thermoplastic liner of a metallic conduit, providing the gas to the liner at a location generally adjacent the metallic conduit, causing the heated gas to flow generally in an annular path generally concentrically about the projecting end and toward a terminal portion of the liner, reversing the flow of the heated gas and causing the gas to flow in a generally annular path within the conduit liner to generally uniformly heat the projecting liner portion.

Also contemplated within the scope of the present invention is a heating apparatus particularly suited and adapted to heat a projecting end of a thermoplastic liner of a lined conduit, the apparatus comprising a first or outer housing having a generally cylindrical cup-like configuration, the outer housing having a first or open end terminating in a plane generally normal to the axis of generation of the generally cylindrical portion, the housing having a second or a closed end remotely disposed from the first end, the second end defining means to receive and generally uniformly radially distribute the heated gas, a second or inner housing of generally cylindrical configuration disposed within the first or outer housing, the inner housing having a first or open end disposed generally adjacent the first end of the outer housing, the plane of the open end of the inner housing being generally parallel to the plane of the opening of the outer housing and being displaced toward the second end of the outer housing, the inner housing having a second or closed end disposed generally adjacent and spaced from the second end of the outer housing, the inner housing being adapted to receive a projecting end of a thermoplastic liner of lined conduit, a generally discoidal baffle supported adjacent the first ends of the inner and outer housings, the discoidal baffle lying in a place generally parallel to the plane of the first end of the outer housing and being disposed external to space enclosed by the outer housing.

Further features and advantages of the present invention will become more apparent from the following specification taken in connection with the drawing wherein:

FIG. 1 is a partly in-section view of an apparatus in accordance with the invention in engagement with a thermoplastic lined pipe to be flanged.

FIG. 2 is an end view of the heating apparatus depicted in FIG. 1.

In FIG. 1, there is depicted a heating apparatus in accordance with the present invention generally designated by the reference numeral 10. The apparatus 10 has a first or outer housing 11. The housing 11 has a first or open end 12. The housing 11 is of a generally cylindrical configuration. The open end 12 lies in a plane which is generally normal to the axis of generation of the cylindrical housing 11. The housing 11 has adjacent the open end 12 and affixed thereto a plurality of guide means 13. The guide means 13 comprise an angular bracket 14 having a first leg 15 affixed to the housing 11 and a second leg 16 disposed generally coplanar with the plane of the first end 12. Legs 16 have affixed thereto guide pins 17. The housing 11 has a second or closed end 19. The closed end 19 has generally centrally disposed therein a conduit or heated gas receiving means 21 which is generally coaxially disposed with the housing 11. A hot air source 22 is in engagement with the conduit 21. A second or inner housing 23 is disposed within the housing 11. The housing 23 is of generally like configuration to the housing 11 and has a first or open end 24. The open end 24 is generally parallel to the open end 12 of the housing 11. The open end 24 lies in a plane generally parallel to the plane of the end 12 and is displaced toward the second end 19 of the housing 11. The housing 23 has a second closed end 25 disposed generally adjacent and parallel to the second end 19 of the housing 11. The housing 23 is maintained in fixed spaced relationship from the housing 11 by means not shown. The bottom 25 of housing 23 defines two small centrally disposed openings 26 generally cylindrically disposed therein. The housings 23 and 11 define therebetween a generally cup-shaped generally radially symmetrical space 27. A generally planar discoidal baffle 28 is supported by the second housing 23; the baffle 28 is generally coaxial with the housings 11 and 23, and is of a similar diameter as the second or inner housing 23. The baffle is generally centrally supported by means of a baffle support or bolt 29 and resiliently tension away from housing 23 by a resilient tension means or helical compression spring 31.

The apparatus 10 is in engagement with a lined conduit generally designated by the reference numeral 33. The conduit 33 comprises an outer or metallic conduit 34 which includes flange portion 35 having flange bolt holes 36 which are in engagement with locating pins 17. Conduit 33 has a synthetic resinous liner 38. The liner 38 has a projecting portion 39. "Projecting portion" means a portion of the liner 38 which is not surrounded by the metal conduit 34. The liner portion 39 extends into the housing 23 whereas the baffle 28 extends into the conduit beyond a terminal face 41 of the flange 35.

FIG. 2 is a face view of the apparatus of FIG. 1 showing the concentric arrangement of housings 11 and 23 and three supporting means or rods 42 which maintain the housings 11 and 23 in fixed spaced relationship and welded thereto.

In operation of the apparatus of FIGS. 1 and 2, hot air or other heated gas is provided by the source 22 to conduit 21. The heated gas flows from conduit 21 into space 27 where it flows generally radially symmetrically outward and axially toward the flange 35 then radially inwardly in the region adjacent face 41 of the flange 35. The gas then flows axially outward from the conduit 34 toward the second end 25 of the inner housing 23 and axially inwardly within the extending liner portion 39 over the baffle 28 and is discharged at the opposite end of the lined conduit not shown. A small portion of the heated gas flows through the openings 26.

Also, the apparatus in accordance with the present invention is operative and will heat plastic liners for flanging. It is preferred that openings equivalent to the openings 26 be present. The exact functions of such openings are not understood, but substantially more uniform and more rapid heating is obtained when such openings are present. Such openings need not be large and preferably are relatively small. When an apparatus in accordance with the invention is employed to heat the projecting liner of a 6 inch pipe, the openings 26 which have a diameter of 3/32 of an inch are very adequate. Beneficially, the heating apparatus in accordance with the present invention is readily fabricated from sheet metal. The thickness of the sheet metal is not critical. However, for service and durability, thickness of the sheet metal on the order of about 1/10 of an inch is adequate. The guide means are readily fabricated from mild steel rod of suitable size for the bolt holes. The baffle 28 advantageously is a relatively thin material, and the spring 31 gives sufficient tension that the baffle is maintained in a plane generally normal to the axis of the support member 29, and the baffle 28 under the influence of gentle pressure can tilt. The resilient mounting of the baffle prevents damage to partially softened liner in the event the liner has been insufficiently heated and the apparatus must be reapplied to bring the projecting portion of the liner to flanging temperature. Advantageously, the heating means such as the means 22 may be a combination centrifugal blower and heating element frequently referred to as a heat gun. The method and apparatus of the invention may be applied to heating a wide variety of thermoplastic resinous pipe liners.

What is claimed is:

1. A heating apparatus particularly suited and adapted to heat a projecting end of a thermoplastic liner of a lined conduit, the apparatus comprising a first or outer housing having a generally cylindrical cup-like configuration, the outer housing having a first or open end terminating in a plane generally normal to the axis of generation of the generally cylindrical portion, the housing having a second or a closed end remotely disposed from the first end, the second end defining means to receive and generally uniformly radially distribute the heated gas, a second or inner housing of generally cylindrical configuration disposed within the first or outer housing, the inner housing having a first or open end disposed generally adjacent the first end of the outer housing, the plane of the open end of the inner housing being generally parallel to the plane of the opening of the outer housing and being displaced toward the second end of the outer housing, the inner housing having a second or closed end disposed generally adjacent and spaced from the second end of the outer housing, the inner housing being adapted to receive a projecting end of a thermoplastic liner of lined conduit, a generally discoidal baffle supported adjacent the first ends of the inner and outer parallel to the plane of the first end of the outer housings, the discoidal baffle lying in a place generally parallel to the plane of the first end of the outer housing and being disposed external to space enclosed by the outer housing.

2. The apparatus of claim 1 including a generally centrally disposed vent in said second or inner housing.

3. The apparatus of claim 1 including generally peripherally disposed guide means adapted to mate with a pipe flange.

4. The apparatus of claim 3 wherein the guide means are generally axially projecting pins.

5. The apparatus of claim 1 wherein the baffle is resiliently supported.

* * * * *